United States Patent
Winston

(10) Patent No.: US 10,696,390 B2
(45) Date of Patent: Jun. 30, 2020

(54) AIRCRAFT HAVING INDEPENDENTLY VARIABLE INCIDENCE CHANNEL WINGS WITH INDEPENDENTLY VARIABLE INCIDENCE CHANNEL CANARDS

(71) Applicant: Robert Allen Winston, Lusby, MD (US)

(72) Inventor: Robert Allen Winston, Lusby, MD (US)

(73) Assignee: Hop Flyt Inc, Lusby, MD (US)

( * ) Notice: Subject to any disclaimer, the term of this patent is extended or adjusted under 35 U.S.C. 154(b) by 262 days.

(21) Appl. No.: 15/676,054

(22) Filed: Aug. 14, 2017

(65) Prior Publication Data
US 2018/0086447 A1    Mar. 29, 2018

Related U.S. Application Data

(60) Provisional application No. 62/384,740, filed on Sep. 8, 2016.

(51) Int. Cl.
*B64C 29/00* (2006.01)
*B64C 3/38* (2006.01)
(Continued)

(52) U.S. Cl.
CPC ............ *B64C 29/0033* (2013.01); *B64C 3/32* (2013.01); *B64C 3/385* (2013.01); *B64C 39/066* (2013.01);
(Continued)

(58) Field of Classification Search
CPC ..... B64C 39/005; B64C 39/066; B64C 39/12; B64C 3/385; B64C 29/0033; B64C 29/0075
See application file for complete search history.

(56) References Cited

U.S. PATENT DOCUMENTS 2,589,994 A †  3/1952  Custer
2,693,920 A *  11/1954  Taylor ................ B64C 29/0033
                                                    244/15
(Continued)

FOREIGN PATENT DOCUMENTS

| CA | 2934346 A1 | 12/2017 |
| CN | 107140203 | 9/2017 |
| CN | 107719659 | 2/2018 |

OTHER PUBLICATIONS

Tandem/tilt-wing 4 rotor heli—RC Groups, RC Groups forum thread Nov. 3, 2005 through.†

*Primary Examiner* — Richard R. Green
(74) *Attorney, Agent, or Firm* — Univ./Maryland Balt., MIPLRC

(57) ABSTRACT

An aircraft includes a fuselage and a pair of channel wings which may vary incidence with respect to the fuselage and a pair of channel canards which can also vary incidence with respect to the fuselage and that can move independently of each other for the purpose of vertical takeoff and landing as well as forward and reverse flight. The wings may have multiple channels and may be powered by single propeller or contra-rotating propellers. The thrust to the propellers may be provided with an internal combustion engine or electric motors or a turbo prop or hybrid system. The channel wing allows the fuselage to maintain a level pitch with respect to the horizon. The aircraft will also have increased maneuverability in hover because it can independently vary the incidence of the wings and canards and be able to tightly turn about a point.

11 Claims, 6 Drawing Sheets

(51) Int. Cl.
  *B64C 39/12* (2006.01)
  *B64C 3/32* (2006.01)
  *B64C 39/06* (2006.01)
  *B64D 27/24* (2006.01)
  *B64D 27/12* (2006.01)
  *B64D 27/02* (2006.01)

(52) U.S. Cl.
  CPC .............. *B64C 39/12* (2013.01); *B64D 27/12* (2013.01); *B64D 27/24* (2013.01); *B64D 2027/026* (2013.01); *Y02T 50/64* (2013.01)

(56) References Cited

U.S. PATENT DOCUMENTS

| | | | | |
|---|---|---|---|---|
| 2,937,823 | A | * | 5/1960 | Fletcher .............. B64C 29/0033 244/12.6 |
| 2,961,188 | A | * | 11/1960 | Taylor ................... B64C 39/066 244/12.4 |
| 5,405,243 | A | | 4/1995 | Hurley et al. |
| 5,597,137 | A | * | 1/1997 | Skoglun .............. B64C 29/0033 244/12.4 |
| 7,146,921 | B2 | | 12/2006 | Fontanille et al. |
| 8,720,814 | B2 | * | 5/2014 | Smith ................. B64C 29/0033 244/12.4 |
| 8,733,690 | B2 | | 5/2014 | Bevirt et al. |
| 9,045,226 | B2 | | 6/2015 | Piasecki et al. |
| 9,156,550 | B2 | * | 10/2015 | Nam ..................... B64C 39/066 |
| 2012/0091257 | A1 | | 4/2012 | Wolff et al. |
| 2017/0159674 | A1 | | 6/2017 | Maciolek |
| 2017/0203839 | A1 | * | 7/2017 | Giannini ................. B64C 3/385 |
| 2018/0086448 | A1 | | 3/2018 | Kroo et al. |
| 2019/0071174 | A1 | † | 3/2019 | Burigo |
| 2019/0092445 | A1 | | 3/2019 | Bailey |

\* cited by examiner
† cited by third party

AIRCRAFT HAVING INDEPENDENTLY VARIABLE INCIDENCE CHANNEL WINGS WITH INDEPENDENTLY VARIABLE INCIDENCE CHANNEL CANARDS

CROSS REFERENCE TO RELATED APPLICATION

This application claims the benefit of U.S. Provisional Patent Application No. 62/384,740 filed Sep. 8, 2016.

BACKGROUND OF THE INVENTION

The present invention relates to aircraft and a wing or a portion of a wing that is comprised of an airfoil which transcribes an arc to channel air accelerated by a propeller the purpose of providing lift, herein called a channel wing. In particular, the present invention is directed toward an aircraft having a fuselage and channel wings and channel canards that may vary incidence independent of each other and with respect to the fuselage for the purpose of vertical takeoff and landing, forward flight, reverse flight, hovering and hovering turns.

Aircraft that can vertically takeoff and land, have a high payload capacity and a high forward speed are desirable. A channel wing is a method to provide additional lift and has been used for short takeoff and landing aircraft. However, a fixed incident channel wing with conventional aircraft control surfaces is unable to takeoff and land vertically because of lack of controllability at very low airspeeds. Variable incidence wings have been used to lower takeoff and landing speeds and thus reduce the distances to take off and land but are unable to vertically take off and land because of lack of lift.

BRIEF SUMMARY OF THE INVENTION

The present invention provides a unique solution for the aforesaid problems in that it combines a channel wing with an independently variable incidence wing and a channel canard with an independently variable incidence canard that allows for an arrangement that results in an aircraft that can vertically takeoff and land and maintain controllability at zero and low forward airspeeds.

The present invention provides three highly desirable capabilities in an aircraft. These capabilities are: vertical takeoff and landing, a high payload capacity and a high cruise speed. The present invention also eliminates the need for conventional aircraft control surfaces because controllability will be achieved by varying incidence and the lift in the wing and canard channels.

The present invention comprises an aircraft having a fuselage and a pair of channel wings which may vary incidence with respect to the fuselage and a pair of channel canards which also may vary incidence with respect to the fuselage and can move independently of each other for the purpose of vertical takeoff and landing and forward and reverse flight. The wings may have single or multiple channels and may be powered by a single propeller, multiple propellers or contra-rotating propellers. The thrust to the propellers may be provided with an internal combustion engine or electric motors or a turbo prop or hybrid system.

In the present invention, the angle of incidence of a wing and the canard may be varied to a point which the resultant lift of the thrust from the propellers and the lift from the wings and canards provides the lift required for vertical takeoff and landing. Once takeoff is achieved, the wings and canards rotate to a cruise position for forward flight. The wing also allows the fuselage to maintain a level position relative to the horizon. The aircraft will also have great maneuverability in hover because of the ability to independently vary the incidence of the canards and wings and be able to tightly turn about a point. The canards and wings can also be positioned in such a manner that the aircraft can fly in reverse flight.

DETAILED DESCRIPTION OF THE INVENTION

Figure 1:
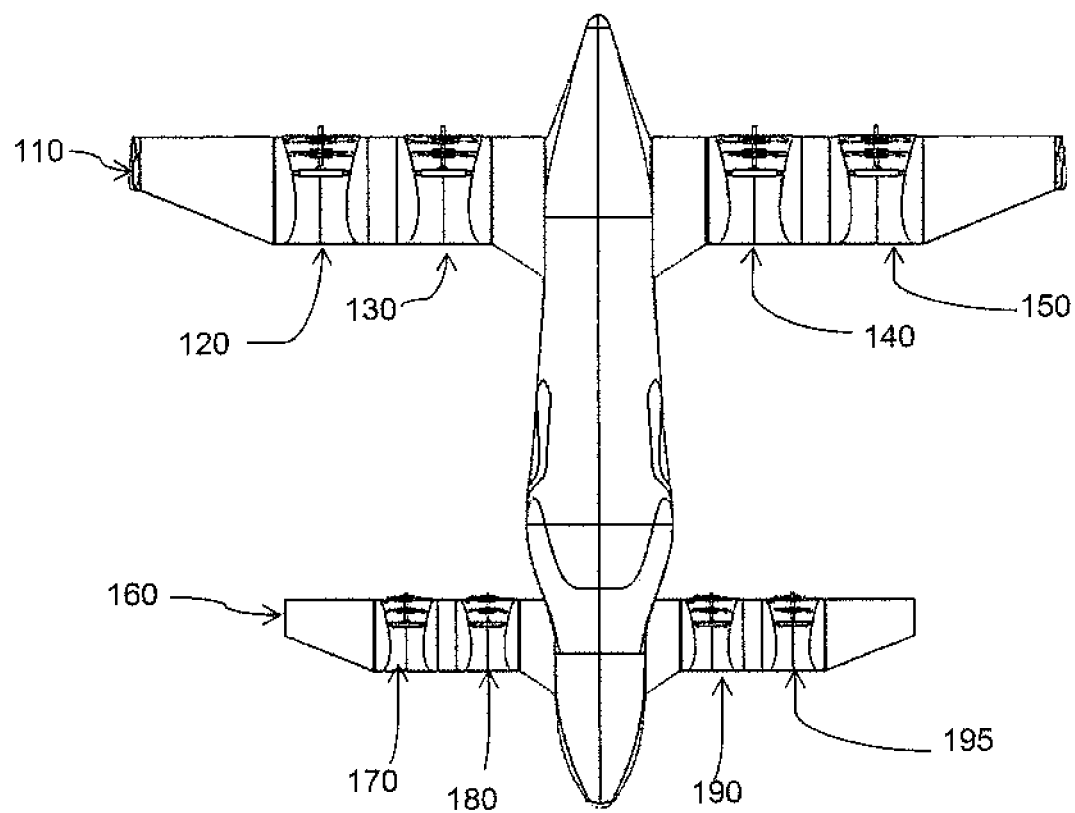
FIG. 1 is a diagram illustrating the aircraft at rest.

FIG. 1 is a diagram illustrating the aircraft at rest. In this diagram the aircraft's wing 110 is made up of four channels 120, 130, 140 and 150. The aircraft's canard 160 is made of four channels 170, 180, 190 and 195.

Figure 2:
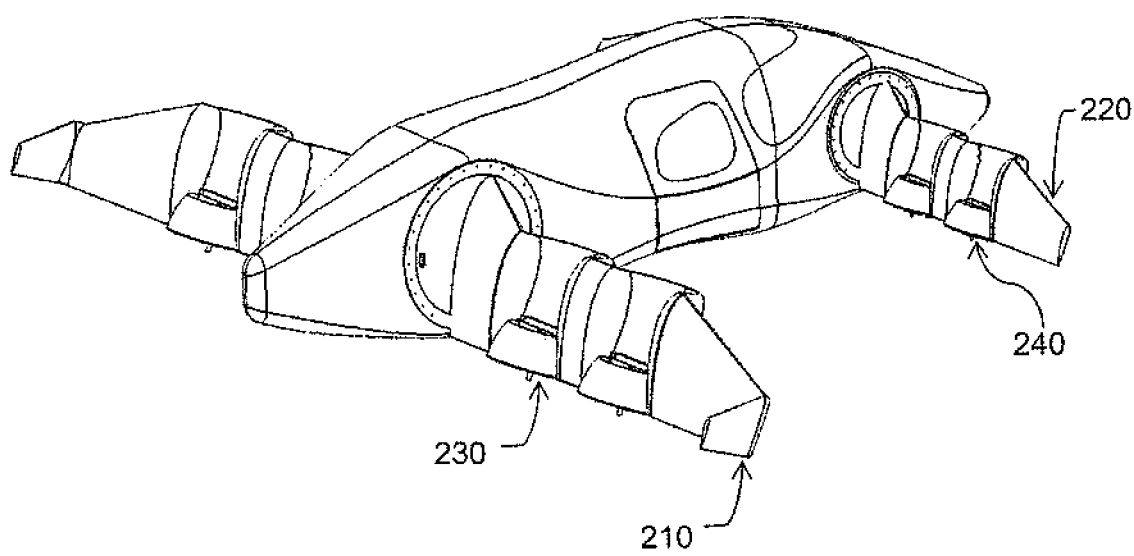
FIG. 2 is a diagram illustrating the aircraft in the vertical takeoff and landing configuration of the present invention.

FIG. 2 is a diagram illustrating the aircraft in the vertical takeoff and landing configuration of the present invention. The aircraft of the present invention will be able to independently vary the incidence of the wing 210 as well as the angle of incidence of the canard 220 as required for takeoff, landing, and flight. During liftoff the channel wings and channel canards rotate such that the resultant of the thrust from the propellers and the lift from the wings and canards provide the lift required for vertical takeoff. A portion of the channel wing 230 and the channel canard 240 can become a ducted propeller, by enclosing the propeller(s) with a retractable mechanism, for takeoff and landing allowing for extra thrust, reduction of noise and protection of bystanders.

Figure 3A:
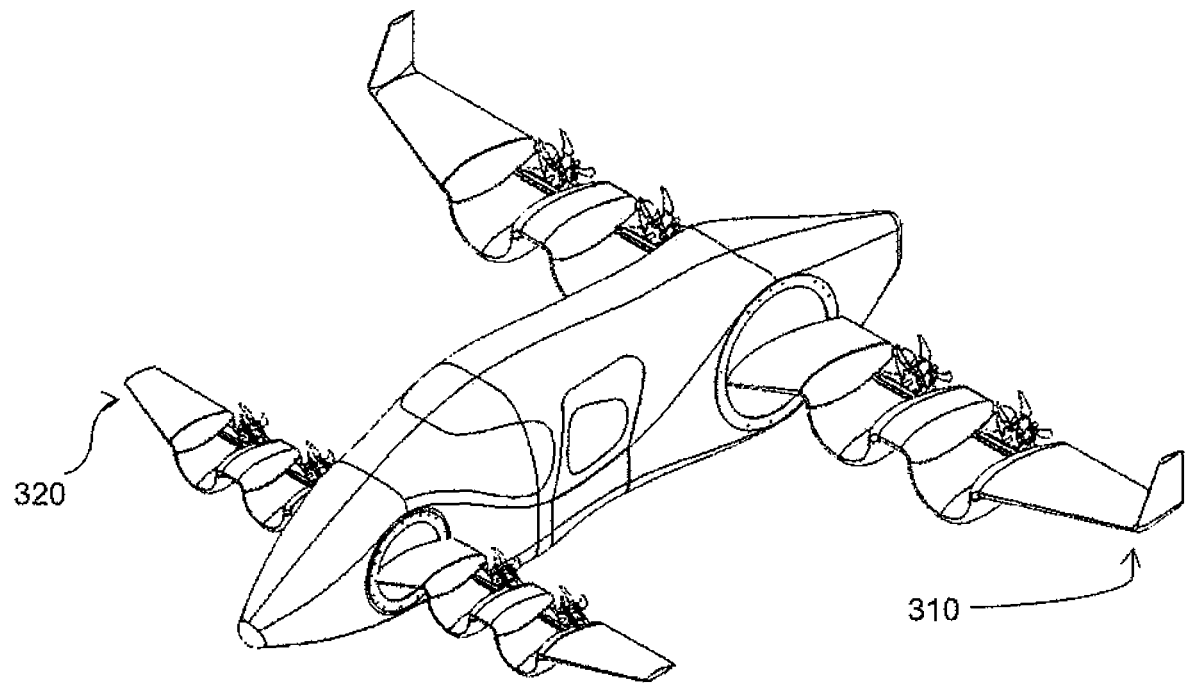
FIG. 3A is an isometric diagram illustration of the aircraft in the cruise condition of the present invention.
Figure 3B:
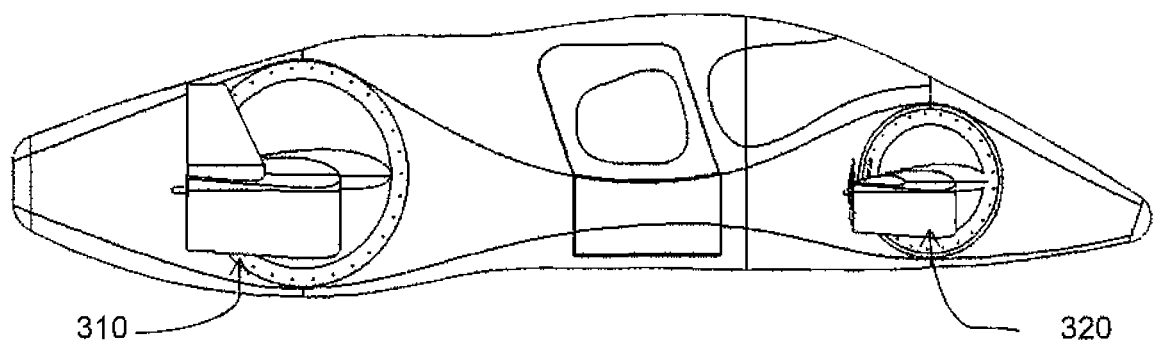
FIG. 3B is side diagram illustration of the aircraft in the cruise condition of the present invention.
Figure 4:
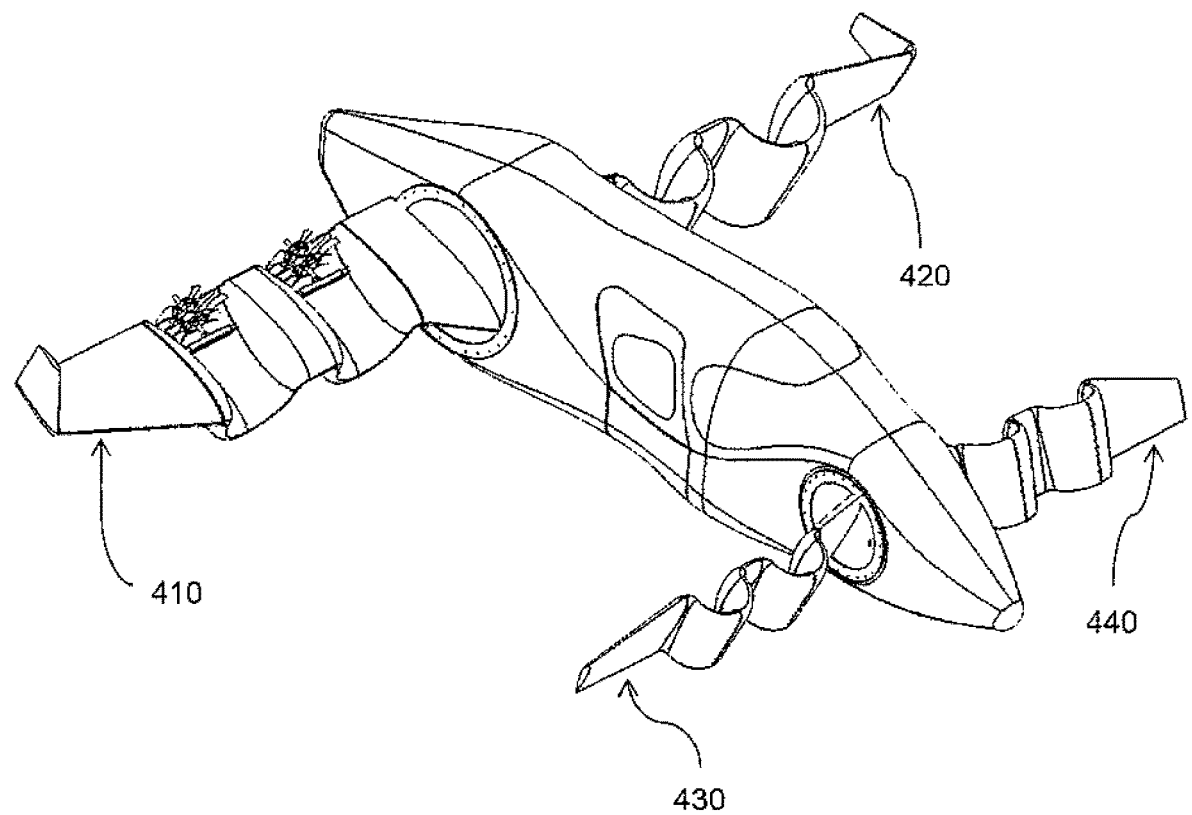
FIG. 4 is a diagram of the aircraft illustrating the aircraft in a hover showing the canards and wings in a position for a tight turn.

Referring to FIGS. 3A and 3B, these illustrate the aircraft in the cruise condition. The wing 310 and canard 320 are rotated to a position required to maintain lift for forward flight. FIG. 4 is a diagram of the aircraft of the present invention illustrating the aircraft in a turning hover. This figure shows the right wing 410 and left wing 420 at independent angles of incidence for a hovering left turn. The figure shows the right canard 430 and left canard 440 also positioned independently to provide both lift and thrust for a tight hovering left turn.

Figure 5:
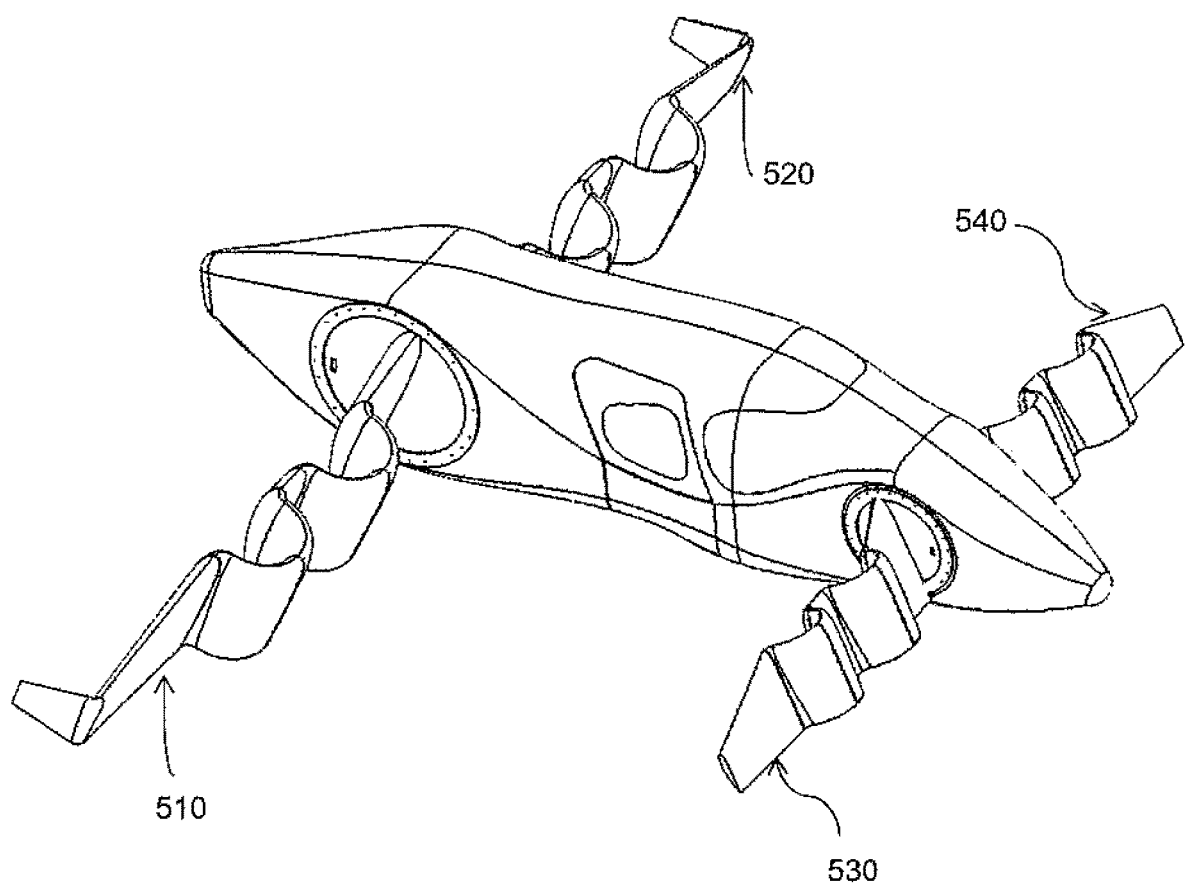
FIG. 5 is a diagram illustrating the aircraft flying in reverse flight.

FIG. 5 is a diagram illustrating the aircraft flying in reverse flight. Referring to this figure, the wing 510 and 520 is at the angle of incidence for the greatest amount of lift, while the canards 530 and 540 are positioned to provide both lift and reverse thrust.

Figure 6:
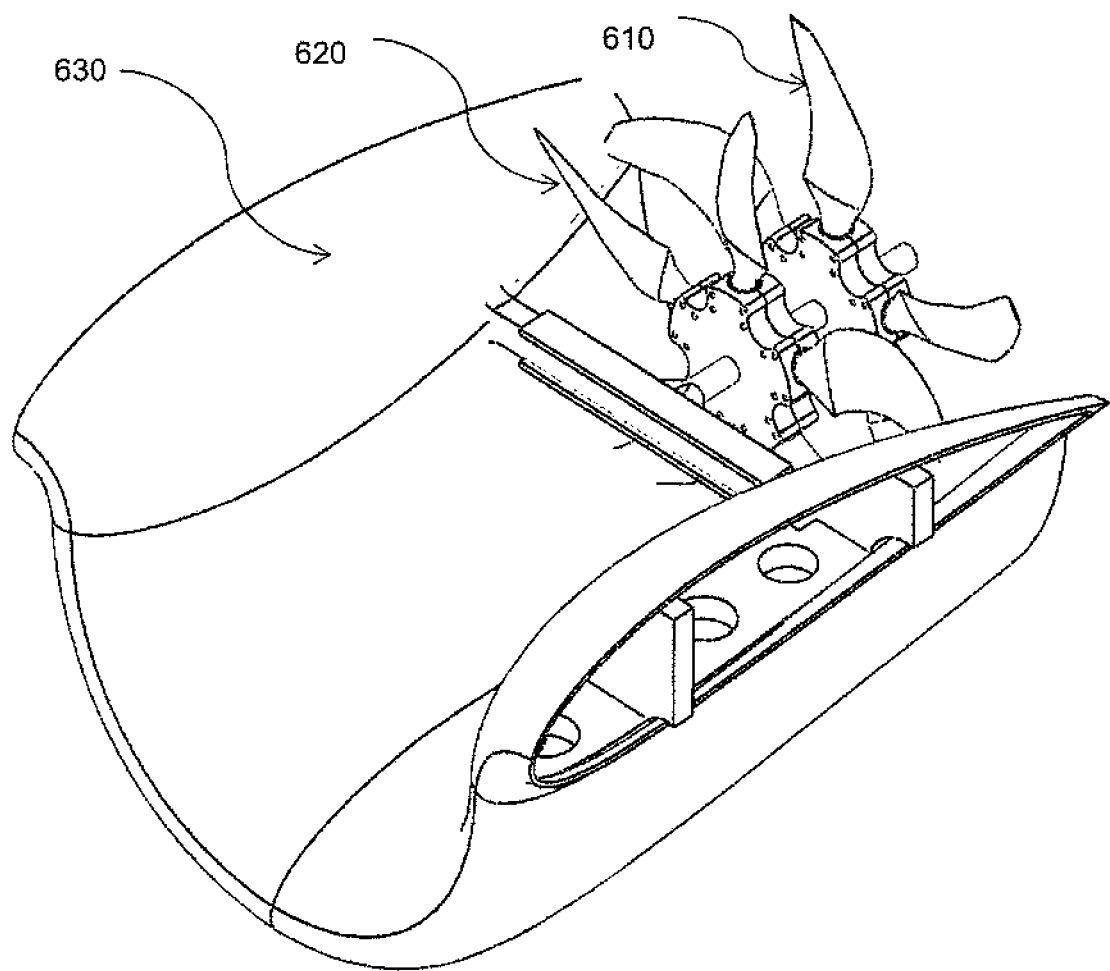
FIG. 6 is a close up of a channel of the aircraft of the present invention and showing a possible contra-rotating configuration with high thrust propellers.

FIG. 6 is a close up of a channel of the aircraft and shows a possible contra-rotating configuration with high thrust propellers 610 and 620. The contra-rotating propeller system allows for high thrust and lift from the channel. The internal combustion engine(s), electric motor(s), turbo prop or hybrid power system may reside in the nacelle 630.

While the preferred embodiment and various alternative embodiments of the invention have been disclosed and described in detail herein, it may be apparent to those skilled in the art which various changes in form and detail may be made therein without departing from the spirit and scope thereof.

The invention claimed is:

1. An aircraft comprising:
   a fuselage;
   a first channel wing;
   a second channel wing;
   a first channel canard; and
   a second channel canard;
   wherein the first and second channel wings are coupled to the fuselage and have at least one propeller each, and where the first and second channel wings have controlled independently variable incidences relative to the fuselage; wherein the first and second channel canards are coupled to the fuselage and have at least one propeller each, and where the first and second channel wings have controlled independently variable incidences relative to the fuselage;
   wherein at least one of a propeller of the channel wings and a propeller of the channel canards can become ducted propellers by enclosing the at least one of the propeller of the channel wings and the propeller of the channel canards with a retractable mechanism for takeoff and landing.

2. The aircraft of claim 1, wherein the independently variable incidence channel wings and the independently variable incidence channel canards are configured to provide control for the aircraft, eliminating the need for standard aircraft control surfaces such as ailerons and rudders.

3. The aircraft of claim 1, configured to supply thrust via either a single propeller, multiple propellers or contra-rotating propellers attached to the first and second channel wings.

4. The aircraft of claim 1, configured to supply thrust via either a single propeller, multiple propellers or contra-rotating propellers attached to the first and second channel canards.

5. The aircraft of claim 1, wherein power for the propellers of the first and second channel wings, and power for the first and second channel canards is providable by at least one of: an internal combustion engine, an electric motor, a turbo prop or a hybrid system.

6. The aircraft of claim 1, wherein power to, and thrust of the propellers of the channel wings and channel canards are variable.

7. The aircraft of claim 1, wherein at least one of the angles of incidence of one or more channel wings and the angle of incidence of one or more channel canards is independently variable.

8. The aircraft of claim 1, wherein the variable incidence of the first and second channel wings, and of the first and second channel canards allows for a smooth transition from vertical takeoff to forward flight.

9. The aircraft of claim 1, wherein the variable incidence of the first and second channel wings, and of the first and second channel canards allows for a smooth transition from forward flight to vertical landing.

10. The aircraft of claim 1, wherein the variable incidence of the first and second channel wings, and of the first and second channel canards allows for hovering and slow flight.

11. The aircraft of claim 1, wherein the variable incidence of the first and second channel wings, and of the first and second channel canards allows for reverse flight.

\* \* \* \* \*